E. FLICEK.
LATHE CENTER.
APPLICATION FILED MAR. 10, 1919.
1,326,653.
Patented Dec. 30, 1919.
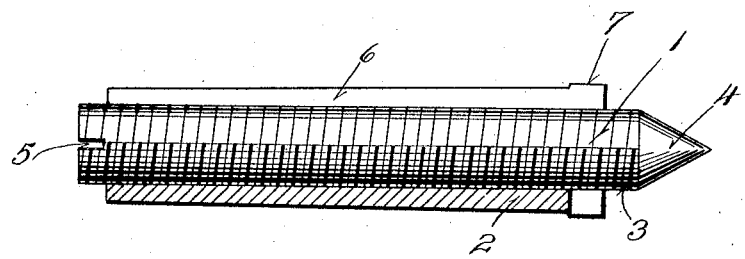
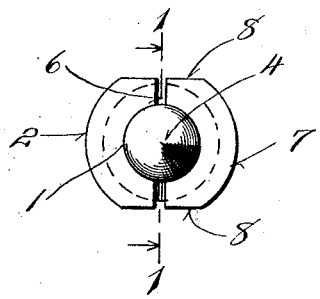
WITNESS
J. P. Britt
INVENTOR
Edward Flicek
BY
ATTORNEYS

UNITED STATES PATENT OFFICE.

EDWARD FLICEK, OF HARTFORD, WISCONSIN.

LATHE-CENTER.

1,326,653.     Specification of Letters Patent.     Patented Dec. 30, 1919.

Application filed March 10, 1919. Serial No. 281,803.

*To all whom it may concern:*

Be it known that I, EDWARD FLICEK, a citizen of the United States, and resident of Hartford, in the county of Washington and State of Wisconsin, have invented certain new and useful Improvements in Lathe-Centers; and I do hereby declare that the following is a full, clear, and exact description thereof.

My invention relates to improvements in attachments for turning lathes, more particularly to the head and tail stock centers therefor.

To those skilled in the art to which the present invention relates, it is well known that the points of lathe centers, particularly the tail stock center, wear off quite rapidly even though they are made of high grade steel, and consequently must be frequently reground.

Naturally after several regrinding operations the average one-piece center becomes too short for proper coöperation with the portion of the lathe in which it is used and must be scrapped. In a large shop the number of lathe centers discarded for this reason is considerable, and the cost thereof amounts to an appreciable sum after a short length of time.

It is therefore the principal object of the present invention to provide an arrangement whereby the cone end of a lathe center may be ground a very great number of times before the stock from which it is formed is entirely used up. The part of the invention associated with the lathe center stock is adapted to be used indefinitely, it being merely necessary to substitute a new piece of stock when the original has been reduced to a very small size.

With these general objects in view, the invention resides in the novel features of construction, combination and arrangement of parts which will be hereinafter more particularly described and claimed and shown in the drawing in which:

Figure 1 represents a vertical longitudinal sectional view through a lathe center constructed in accordance with my invention, said section being taken centrally on the plane of the line 1—1 of Fig. 2, and Fig. 2 is an end view of the member.

Referring more particularly to the drawing, it will be noticed that the invention consists only of two elements, a lathe center proper 1 and a sleeve 2. The part 1 is formed from a single piece of cylindrical steel stock of uniform diameter and appropriate length and is threaded throughout the major portion of its length as at 3, one end, however, being provided with a 60° cone point 4 as is customary on all lathe centers. The opposite end of this cylindrical bar forming the lathe center proper has a kerf 5 for reception of the end of a screw-driver or other instrument.

Inasmuch as the bores in the head and tail stocks of a lathe are tapered, the sleeve 2 is tapered to a similar degree as is the case of the ordinary lathe center to readily fit therein, and the opening thereof is provided with a left-hand thread for coöperation with the similar left-hand thread of the part 1. To permit the lathe center proper 1 to be readily shifted longitudinally within the sleeve, the latter is split as at 6 throughout its length, such an arrangement also allowing the sleeve to clamp tightly about the other part.

It will be noticed that the tapered end 4 of the part 1 extends outwardly of the adjacent or large end of the sleeve 2 so as to readily engage the work or the like on the lathe. As the point becomes dulled or worn through such engagement, it is necessary at times at regrind the same. The advantages of this invention will become readily apparent when it is considered that several of such regrinding operations quickly uses up an appreciable quantity of metal, but in view of the coöperative relationship between the lathe center proper and the sleeve, the former may always have its end 4 projected a proper distance beyond the adjacent end of the sleeve so long as the screw threads of the two parts engage.

At the large end of the sleeve 2 is a radial flange 7 having diametrically opposite flattened portions 8 as most clearly shown in Fig. 2. As a result of these surfaces the lathe center will be prevented from rolling to any great extent when removed from the head or tail stock of the lathe and placed on the flat or inclined surface.

From the foregoing description it will be evident that I have produced a very simply constructed lathe center which will readily overcome the defects of the average lathe center and as set forth hereinbefore, various minor changes may be made in the form and proportion of the several parts of the device without departing from or sacrificing any of the advantages of the invention as defined by the appended claims.

I claim:

1. A device of the class described comprising a sleeve having a longitudinally extending bore of uniform diameter and opening through its opposite ends, a tool disposed in said bore and having one end extended beyond one end of the sleeve, and coöperating means on said tool and sleeve to hold the former in adjusted extended positions with respect to the latter, the extended end being variously projected by the engagement of a suitable article with the opposite end thereof through the adjacent open end of the sleeve.

2. A device of the class described comprising a sleeve having a longitudinally extending bore of uniform diameter and opening through its opposite ends, a cone end lathe center disposed in said bore, said cone end being extended beyond one end of the sleeve, and coöperating means on said center and sleeve to hold the former in adjusted positions with respect to the latter, the cone end thereof being variously projected by the engagement of a suitable tool with the opposite end of said center through the adjacent open end of the sleeve.

3. A device of the class described comprising a sleeve having a longitudinally extending bore of uniform diameter opening though its opposite ends, said sleeve being split longitudinally throughout its length, a tool disposed in said bore and having one end extended beyond the end of the sleeve, coöperating screw threads on said tool and the wall of said bore to hold the former in adjusted extended positions with respect to the sleeve, the extended end of said tool being variously projected by the engagement of a suitable article with the opposite end thereof and the spreading of the slot of the split sleeve.

In testimony that I claim the foregoing I have hereunto set my hand at Hartford, in the county of Washington, and State of Wisconsin.

EDWARD FLICEK.